United States Patent Office 3,003,324
Patented Oct. 10, 1961

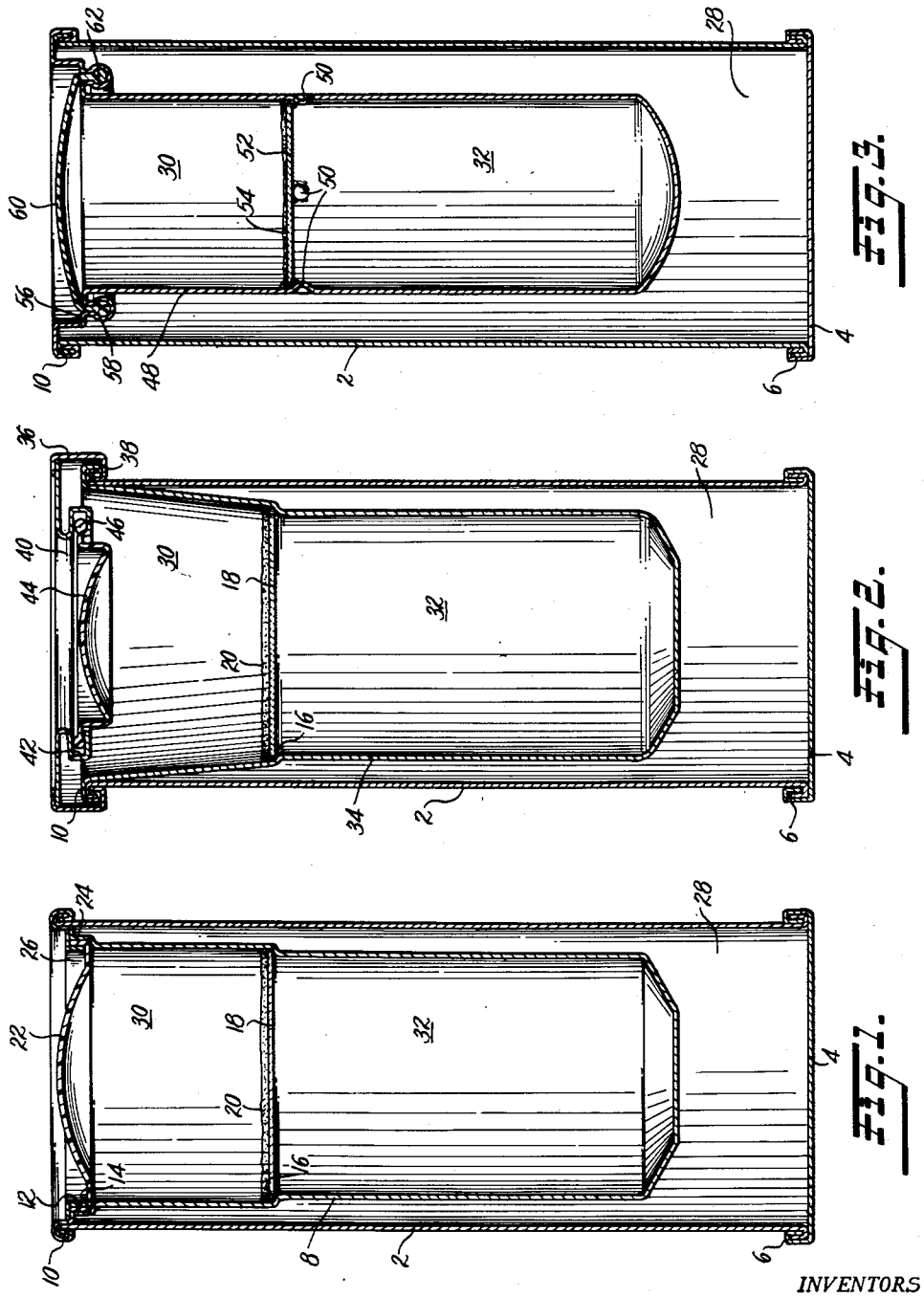

3,003,324
CONTAINER FOR BEVERAGES OR THE LIKE
John R. Vance, R.R. 1, Box 516, Clayton, Ohio, and William R. Donnelly, 903 Washington Ave., Piqua, Ohio
Filed July 7, 1959, Ser. No. 825,541
3 Claims. (Cl. 62—4)

This invention relates to containers for beverages or the like having self-contained means adapted to be actuated at will for effecting heating or cooling of the beverage or other product therein.

The invention disclosed in this application is an improvement of and a further embodiment of the disclosure in our copending application Serial No. 752,337, filed July 31, 1958, now Patent No. 2,968,932, for "Cooling Device."

In general the invention comprises a container divided into compartments separated by heat-conducting material. One of the compartments is filled with the beverage or other product while the other compartment is further divided into separate chambers containing chemicals which, when mixed, react to either produce or absorb heat and thus either heat or cool the product. The compartment containing the chemicals is provided with an exterior flexible wall defining a side of one of the chambers therein, which chamber is filled with a liquid. Pressure on the flexible wall results in the transmission of hydraulic pressure to the means within the compartment dividing the same into chambers and effects actuation thereof to establish communication between the chambers whereby the chemicals may mix and react.

The invention further includes means for separately mounting the flexible wall portion so that the product may be sealed in its compartment, then pasteurized or otherwise treated before placing the chemicals in their respective chambers. Thereafter the flexible wall portion may be installed.

A further feature of the invention resides in the provision of a light-transmitting flexible wall portion whereby the color of the liquid at the inner face thereof may be observed and wherein the chemicals employed result in a reacted mixture having a different characteristic color from the liquid originally adjacent the flexible wall. By this means, mere observation of the container tells whether or not it has been used.

Many combinations of chemicals, all well known for this purpose, may be employed. If the product is one that should be heated before use, the chemicals may be of such nature that their intermingling and reacting will result in an exothermic reaction to transfer heat through the heat-conducting walls to the product. On the other hand, if the product is a beverage or the like that should be cooled before use, the chemicals may be of such nature that they absorb heat upon reacting. Such chemicals are well known in the art and need not be enumerated here.

It is therefore an object of this invention to provide a container with controllable self-contained means for changing the temperature of a product stored therein, before use.

Another object of the invention is to provide a container for a beverage or other food product having separated chemicals associated therewith and means for causing intermingling of said chemicals, which means are responsive to hydraulic pressure transmitted thereto through one of the chemical materials.

Still another object of the invention is to provide a container of the type set forth so designed and constructed that the product contained therein may be pasteurized or otherwise heat-treated before placing the reactive chemicals in the container.

A further object of the invention is to provide a container of the type set forth that is simple and economical in construction and reliable and efficient in operation.

Other and more objects and advantages will become apparent to those skilled in the art as the description proceeds with reference to the accompanying drawings, wherein:

FIGS. 1, 2 and 3 are, respectively, vertical sectional views through different embodiments of the invention.

Referring first to FIG. 1, a main container is shown having a cylindrical side wall 2 and a bottom wall 4 sealingly joined by a conventional rolled joint 6. A secondary container 8 extends into the main container from the open end thereof and is provided with an end portion sealingly joined to the cylindrical side wall 2 by a conventional rolled joint 10. The secondary container 8 is provided with an offset portion defining an annular surface 12 and a shoulder 14 adjacent its outermost end and is further formed to define a shoulder 16 intermediate its ends.

A frangible diaphragm or disc 18 is seated on the shoulder 16 and is sealed at its periphery to the secondary container 8 by any suitable means, such as indicated at 20. The sealing means 20 may be a wax, cement, or other material inert to the chemicals to be described. As stated, the diaphragm or disc 18 is frangible and may be constructed of ceramic or resinous material but is of such character that it will rupture upon the application of undue pressure to the upper face thereof.

A flexible wall portion 22 in the form of an outwardly convex diaphragm closes and seals the outer end of the secondary container 8. The diaphragm 22 is provided with a peripheral flange 24 seated against the inner face of the annular portion 12 while the periphery of the diaphragm rests on shoulder 14. A clamping ring 26, of generally L-shape in section, frictionally clamps the flange 22 in sealing relation to the annular surface 12 and holds the diaphragm 22 in sealed closing relation to the secondary container 8.

It will be apparent that the secondary container 8 divides the main container into a first compartment 28 and an inner compartment comprising chambers 30 and 32. The beverage or other food product is placed in the compartment 28, whereas the chambers 30 and 32 are respectively supplied with chemical materials held apart and separated by the diaphragm 18. The particular chemical material in chamber 30 is preferably liquid. If the chemical material in chamber 30 is not a liquid it is suspended in or immersed in water or other liquid to which it is inert and such liquid completely fills the chamber 30. Assuming that the chemical materials in chambers 30 and 32 are such that they react endothermically, the beverage in compartment 28 may be cooled prior to use by the mere application of inward pressure on the flexible closure 22. The application of such pressure to the outer face of closure 22 causes the same to become distorted inwardly and apply pressure to the liquid in chamber 30. The pressure applied to that liquid is hydraulically transmitted to the upper surface of diaphragm 18 and when of sufficient magnitude causes the diaphragm 18 to fracture or shatter and thus establish communication between chambers 30 and 32, whereby the different chemicals therein may be intermixed and permitted to react in the desired manner. The walls of the secondary container 8, being of heat-conductive material, readily conduct heat from the beverage 28 to the mixed chemicals to support their reaction or, on the other hand, conduct heat from exothermically reacting chemicals into the product in compartment 28.

The flexible diaphragm or closure 22 is preferably made of transparent or translucent material whereby the color of the liquid in chamber 30 may be observed. The chemical materials in chambers 30 and 32 may be of such nature that they change color upon reacting or the chemical material in chamber 32 may include a dye whereby mixing of the chemical materials results in a characteristic color of the mixture different from the color of the liquid originally in chamber 30. Thus by observing the color visible through flexible diaphragm 22, the user may immediately determine whether or not the chemicals have already been mixed.

It will be noted that the compartment 28 containing the beverage or the like may be completely sealed before mounting the frangible diaphragm 18, the insertion of the chemical materials, and the closing of the secondary container 8 by the closure diaphragm 22. Thus the beverage or other food product may be sealed in compartment 28, then pasteurized or otherwise heat-treated and allowed to cool. After that the appropriate chemical material may be placed in chamber 32, the frangible diaphragm 18 mounted in place, the chemical material placed in chamber 30 and the flexible closure 22 then applied and secured in place as described. In this manner pasteurization may be accomplished without subjecting the chemical materials to the heat of pasteurization.

In the embodiment of FIG. 2, parts bearing like numerals may be duplicates of the parts so identified in FIG. 1. In this form of the invention the secondary container 34 is sealed directly to the side wall 2 at rolled joint 10 and is not provided with the annular surface 12 or shoulder 14. This form, however, is provided with the shoulder 16, frangible diaphragm 18 and sealing means 20. This container is likewise divided into a first compartment 28 and a second compartment comprising chambers 30 and 32.

A cap structure 36 is provided with a flange portion 38 extending into the rolled joint 10 and is formed with a central opening 40 bounded by a plurality of flanges defining an inwardly facing channel 42. The flexible closure diaphragm 44 is provided with a peripheral bead 46 tightly and sealingly clamped into channel 42. The operation and use of the embodiment of FIG. 2 is exactly the same as that described in connection with FIG. 1, the chambers 30 and 32 providing space for the chemical materials and compartment 28 providing space for the product. Here again the chemical material in chamber 30 is, or includes, a liquid completely filling that chamber for operation of the device in the manner already described.

The embodiment of FIG. 3 also includes a main container having a cylindrical side wall 2, bottom 4 joined to side wall 2 at rolled joint 6, and a secondary container 48 sealingly joined to the side wall 2 at rolled joint 10. The secondary container 48 is provided with a plurality of inwardly extending dimples of projections 50 on which a disc 52 is seated. The periphery of the disc 52 is sealed to the inner face of the secondary container 48 by suitable rupturable sealing means 54. The partition or diaphragm 52 is preferably rigid, although it may be frangible, if desired. Adjacent its upper end the secondary container 48 is formed with an upwardly facing shoulder 56 in which an upwardly facing annular channel 58 is formed. The channel 58 extends completely around the open upper end of secondary container 48 and is "undercut" as shown. A flexible diaphragm 60, corresponding to the diaphragms 22 and 44, is provided with a peripheral bead 62 firmly clamped in the undercut channel 58 and constitutes a sealed closure for the outer end of chamber 30 which may be installed by forcing bead 62 through the narrow opening at the outer end of channel 58. In the embodiment of FIG. 3 the purpose and function are identical to those of the embodiments of FIGS. 1 and 2 and will be apparent to those skilled in the art. However, in this embodiment the application of hydraulic pressure to the upper surface of diaphragm 52 does not necessarily result in rupture of that diaphragm, since it is preferably of metal or the like, but will result in its bodily displacement downwardly and breaking of the sealing material 54. Hydraulic pressure in chamber 30 and downward pressure on the diaphragm 52 causes the side walls of the secondary container 48 to flex outwardly sufficiently to permit the edge of the diaphragm 52 to snap past projections 50 and thus establish communication between chambers 30 and 32 to initiate reaction between the chemicals therein. The diaphragm 52 is of somewhat smaller diameter than the inner diameter of secondary container 48 whereby a passageway exists around the periphery of the diaphragm when it is displaced as described. In actual operation one edge of the diaphragm 52 will snap past one of the projections 50 and cause the diaphragm to tilt much in the nature of a butterfly valve.

It will be apparent that in all the embodiments described herein all of the objects of this invention have been attained. In each embodiment the transmission of hydraulic pressure from an outer flexible wall portion effects intermingling of the chemical materials. In each embodiment the product may be sealed in its compartment 28 and pasteurized or otherwise treated before the chemical materials are introduced into and sealed in the secondary container. Also, in each embodiment the flexible outer wall is of transparent or translucent material whereby the color of the liquid in the secondary compartment may be observed.

While a limited number of specific embodiments of this invention have been shown and described, it is to be understood that other modifications may be resorted to within the scope of the appended claims.

We claim:

1. A container for beverages or the like, comprising; a main container, heat-conducting means dividing said main container into first and second compartments sealed from each other, said first compartment being completely closed and sealed and having a beverage or the like therein, said second compartment having an opening at the exterior of said container, a flexible exterior wall closing said opening, partition means displaceably mounted in said second compartment spaced from said flexible exterior wall and dividing said second compartment into a first chamber adjacent said flexible wall and a second chamber remote therefrom and being displaceable in response to hydraulic pressure thereon to establish communication between said chambers, chemical materials in said chambers, said chemical materials being such that when mixed, they react with a resultant change in temperature, the chemical in said first chamber including a liquid and completely filling said first chamber whereby inward pressure on said flexible wall is hydraulically transmitted to said partition means to establish communication between said chambers and to permit mixing of the chemicals therein, said flexible exterior wall being of light-transmitting material, said chemical materials being such that a mixture thereof is of a distinctively different color from the chemical material sealed in said first chamber, and means defining an annular channel encompassing said opening, said flexible exterior wall comprising a flexible diaphragm having its periphery sealingly engaged in said annular channel.

2. A container as defined in claim 1, wherein said partition means comprises a frangible partition wall in said second compartment, rupturable by pressure hydraulically transmitted thereto.

3. A container as defined in claim 1, wherein said partition means comprises a partition wall releasably sealed in said second compartment and displaceable by hydraulic pressure applied thereto to break its seal and thus establish communication between said chambers.

References Cited in the file of this patent

UNITED STATES PATENTS

| 1,897,723 | Free | Feb. 14, 1933 |
| 2,746,265 | Mills | May 22, 1956 |
| 2,773,358 | Palmer et al. | Dec. 11, 1956 |
| 2,882,691 | Robbins | Apr. 21, 1959 |

FOREIGN PATENTS

| 513,015 | France | Oct. 27, 1920 |